United States Patent [19]
Ward

[11] 3,784,975
[45] Jan. 8, 1974

[54] ALTERNATELY FLASHING WARNING SYSTEM

[75] Inventor: Richard W. Ward, Westchester, Ohio

[73] Assignee: KD Lamp Co., Cincinnati, Ohio

[22] Filed: Dec. 12, 1972

[21] Appl. No.: 314,372

Related U.S. Application Data

[63] Continuation of Ser. No. 103,427, Jan. 4, 1971, abandoned.

[52] U.S. Cl............................ 340/76, 315/83, 340/83
[51] Int. Cl.................................................. B60q 1/52
[58] Field of Search.................................. 340/76, 83

[56] References Cited
UNITED STATES PATENTS

| | | | |
|---|---|---|---|
| 2,304,963 | 12/1942 | Smith | 340/83 |
| 2,655,642 | 10/1953 | Ayres et al. | 340/83 |
| 2,932,814 | 4/1960 | Wilfert | 340/76 |
| 3,309,562 | 3/1967 | Schultz | 340/76 X |
| 3,609,681 | 9/1971 | Saul | 340/83 X |

FOREIGN PATENTS OR APPLICATIONS 824,887  12/1959  Great Britain .................. 340/81 R Primary Examiner—Kenneth N. Leimer
Attorney—Wood, Herron & Evans

[57] ABSTRACT

The high beam filaments of a vehicle's headlights are controlled to flash in order to provide a warning signal. A double-pole, double-throw flasher swtich, in one position, completes a circuit from a battery through a flasher to the high beam filaments of the headlight to flash the high beams. In the other flasher switch position, the high beams are connected to the battery via the dimmer and main "on-off" switches. Flashing of the high beams in response to activation of the flasher switch is independent of the position of the conventional "on-off" headlight switch and dimmer switch by virtue of the fact that these two switches are not in the flasher circuit. Steady low beam operation may be maintained during the high beam flashing operation, and independently of it, by the dimmer and "on-off" switches, which are connected between the low beams and the battery.

1 Claim, 8 Drawing Figures

PATENTED JAN 8 1974  3,784,975
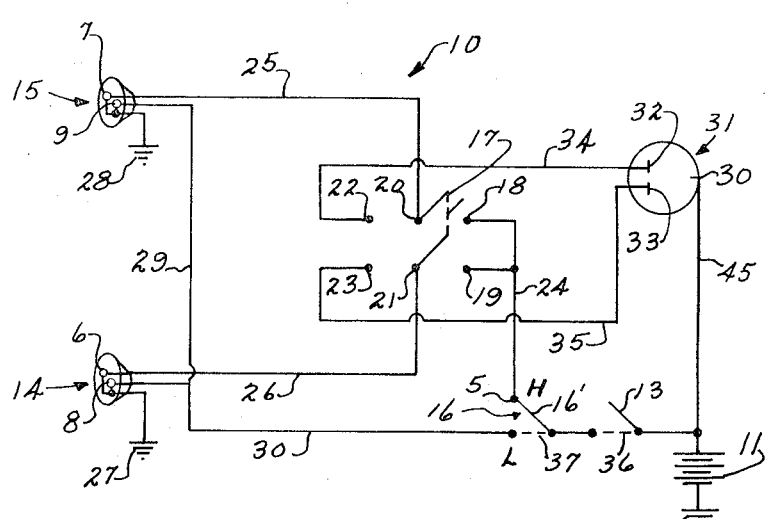
Fig. 1
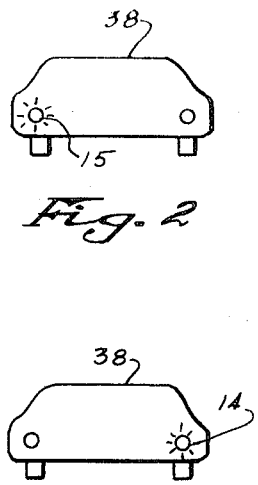
Fig. 2
Fig. 3
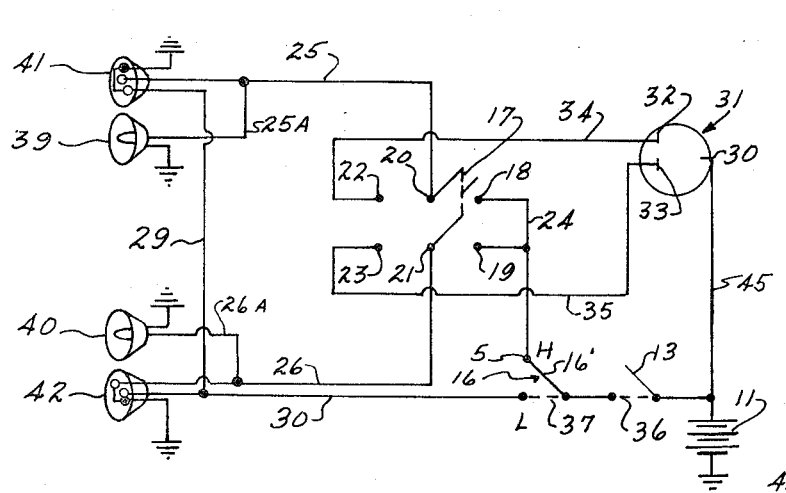
Fig. 4
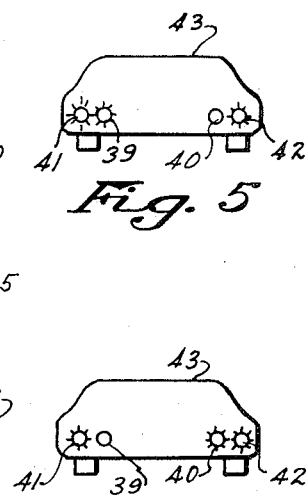
Fig. 5
Fig. 6
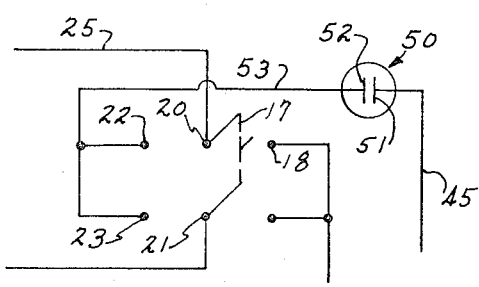
Fig. 8
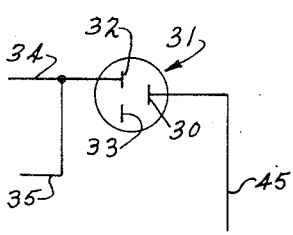
Fig. 7
INVENTOR.
Richard W. Ward
BY
Wood, Herron & Evans
ATTORNEYS

ALTERNATELY FLASHING WARNING SYSTEM

This is a continuation, division, of application Ser. No. 103,427, filed Jan. 4, 1971, now abandoned.

The invention relates to a flashing automobile headlight warning system, and more particularly to a vehicle light warning system of the flashing type, wherein a simplified control circuit is provided for flashing the headlights regardless of the position of the usual light-controlling switches.

Various devices are known which flash the headlights of a vehicle for warning signal purposes. There are, however, certain drawbacks associated with each. For example, the circuitry required to product flashing or alternate flashing has been relatively complex, requiring numerous gang switches and substantial wiring. This unnecessarily adds to their cost.

Another disadvantage has been that, when the prior systems are in their flashing mode, all other current to the headlights is cut off so that the vehicle loses the use of a steady beam during the flashing operation.

Another disadvantage is that the prior devices require manipulation of a number of switches to achieve a desired mode of operation. For instance, the "on-off" switch, the dimmer switch, and others, must all be particularly positioned to initiate a flashing operation.

A further disadvantage of the prior systems, in part attributable to their complexity, is that they are not readily incorporated into existing automobile lighting circuits which do not have a flashing capability. Thus, adoption of such is likely to occur only with respect to new automobiles; the existing automobile market being lost. Thus, owners of automobiles not provided with a means to initiate a flashing headlight operation, if they desire a flashing warning capability, must purchase vehicles already equipped with a flashing device or must go to disproportionate expense and complex modification to provide their existing vehicles with a flashing capability.

One object, then, of the invention is to provide a control circuit for flashing the high beam filaments of a headlight while the other, low beam vehicular headlight units or filaments are either off or steadily illuminated, depending on the desires of the operator.

Another object of the invention is to provide an improved control circuit for controlling the flashing of selected headlight filaments on a vehicle regardless of the position of the usual light controlling switches, such as the headlight "on-off" switch and the dimmer switch.

A further object of the invention is to provide a circuit for controlling the flashing of vehicle headlights, including a flasher switch and a flasher, which circuit is simple and which may be readily adapted with appropriate connections for incorporation in existing headlight control circuits.

Another and yet highly important object of the invention is to provide a control circuit for controlling the alternate flashing of the high beam filaments of a vehicle's headlights independently of other usual switches commonly found on a vehicle, such as a headlight dimmer switch and an "on-off" switch.

The present invention is especially adapted for use in a vehicle having high beam and low beam headlamps, a battery, a conventional dimmer switch with high beam and low beam contacts for alternatively selecting high or low beam operation, and a headlight "on-off" switch connected between the dimmer switch and battery which provides battery power to the dimmer switch to energize, depending on dimmer switch position, the high or low beam filaments. The invention includes a double-pole, double-throw flasher switch and a flasher with two alternately energized outputs which is connected with its input to the battery and its two outputs to two poles of the switch. The other two poles of the switch connect to the high beam contact of the dimmer switch. In its "on" position, the flasher switch connects the two alternatively energized flasher outputs to the two high beam filaments, and, in its normal "off" position, connects the high beam filaments to the high beam contact of the dimmer switch.

In normal low beam operation, current flows from the battery through the closed headlight "on-off" switch, through the low beam contact of the dimmer switch which has been placed in "low" position, and then to the low beam headlamps. Operation of the low beams is independent of the position of the flasher switch, hence the double-pole, double-throw flasher switch is not used in low beam operation.

In normal high beam operation, with the dimmer switch shifted to its "high" position, current flows through the high beam contact of the dimmer switch to the two-pole, double-throw flasher switch. Assuming the flasher switch is in its normal non-flashing position, current flows steadily through it to the high beam filaments so that they are constantly illuminated.

When the flasher switch is in its flashing or "on" position, and the dimmer switch is in its "high" position, current cannot flow directly to the high beam filaments from the battery, since the flasher switch breaks that circuit. Current does, however, flow through the flasher, alternately energizing the two outputs thereof, and in turn the two high beam filaments connected thereto. If steady low beam and alternately flashing high beam operation are concurrently desired, the flasher switch is positioned to its flashing position to connect the alternately energized flasher outputs to the high beam filaments, and the dimmer switch is placed on its "low" position to connect the low beam filaments to the battery to continuously illuminate concurrently with the alternately flashing high beam filaments.

The circuit of this invention includes a minimum of wiring and of switches, and is thus simple and economical. Furthermore, it can be appreciated that the flasher switch and flasher is readily adaptable, with appropriate connections, for use with existing vehicular light controlling circuits. For instance, it is only necessary to connect the flasher input to the battery of a vehicle, one set of flasher switch poles to the high beam filaments of the vehicle's headlights, and the other set of flasher switch poles to the high beam contact of an existing dimmer switch. No other or additional wiring or switches are required, and such modification is relatively easily accomplished.

Alternate embodiments include means for flashing the high beam filaments simultaneously and for retaining the capability of concurrent steady low beam illumination and the independent nature of the flashing control. This is accomplished by connecting the high beam filaments to only one of the flasher's two outputs or by utilizing a single output pulse type of flasher, as will be described.

These and other objects and advantages of the present invention will become more readily apparent from the following detailed description and the drawings, in which:

FIG. 1 is a circuit diagram of a preferred embodiment of the invention wherein two-filament headlights are used, FIG. 2 is a schematic partial view of a vehicle with the flasher turned on and the high beam filament of one headlight illuminated, FIG. 3 is a view of the vehicle of FIG. 2 with the other high beam filament illuminated, FIG. 4 is a circuit diagram of an alternate embodiment of the invention, wherein separate high beam and low beam headlights are utilized, FIG. 5 is a view of a vehicle provided with the alternate embodiment of the invention, wherein the flasher is turned on and one high beam headlamp is flashing, FIG. 6 is a view of the vehicle of FIG. 5 with the other high beam headlamp flashing, FIG. 7 is a diagram of an alternate embodiment of the invention wherein the high beams are connected to only one output of a flasher, and FIG. 8 is a circuit diagram of an alternate embodiment utilizing a pulsating flasher with a single output.

Referring to the drawings, FIG. 1 shows in detail the circuit of the invention indicated generally at 10. The controlling switches are located for convenient manual operation by the operator of a vehicle in which the circuit is employed. A conventional battery 11 is provided as a source of power and is grounded at 12. A main headlight "on-off" switch 13 is provided which is operable to turn the headlights 14 and 15 of a vehicle "on" when in a first position and "off" when in a second position, and are located within reach of the operator of the vehicle. The main switch 13 is shown in its "off" position.

A dimmer switch 16 having high beam contact 16H and low beam contact 16L is provided to alternately connect, via a movable contact 16', the high or low beam filaments of headlights 14 and 15 to the battery through the on-off switch 13. Dimmer switch 16 is shown in its high beam operation position. It, too, is located within reach of the vehicle's operator, and when placed in its other position (as indicated by dotted line 37) conducts a current to the low beam filaments.

A flasher switch is shown generally at 17. This switch is a cOnventional double-pole, double-throw switch of a type known to the art and is located within reach of the vehicle's operator. It has high beam contacts 18 and 19, central contacts 20 and 21, and flasher contacts 22 and 23. Flasher switch 17 has an "off" or first position and an "on" or second position. In the off" position, contacts 20 and 21 are connected to contacts 18 and 19, respectively, which in turn connect via wire 24 to the high beam contact 5 of dimmer switch 16. In the "on" position, contacts 20 and 21 are connected to contacts 22 and 23, respectively, which in turn connect, via wires 34 and 35, to alternate outputs 32 and 33 of flasher 31.

Headlamps 14 and 15 are of conventional design, each including a high beam filament 6 and 7, respectively, and a low beam filament 8 and 9, respectively. These filaments 6, 7, 8 and 9 may be commonly grounded in each headlamp 14 and 15 as shown at 27 and 28, respectively. The high beam filaments and low beam filaments are separately connected to the control circuit as will be described.

For purposes of description it is to be understood that the plurality of low beam filaments may be described as a group of filaments and the high beam filaments may be described as being included in a separate group of filaments.

Central contact 20 of the switch 17 is connected to high beam filament 7 of headlight 15 through wire 25. Central contact 21 of the switch 17 is connected to high beam filament 6 of headlight 14 through wire 26. The low beam filaments 8 and 9 of each headlight 14 and 15 are commonly connected to dimmer switch 16 through wires 29 and 30.

A flasher is diagrammatically shown at 31 and has an input 30 connected to battery 11 through wire 45. The flasher may be of any conventional type which alternates current flow between contacts 30-32 and 30-33. A Model 537 flasher commercially available from the Tung-sol Division of Wagner Electric Co., located at One Summer Avenue, Newark, New Jersey, is satisfactory. Flasher contact 32 is connected to contact 22 of flasher switch 17 through wire 34. Flasher contact 33 is connected to contact 23 of flasher switch 17 through wire 35.

Normal operation of the headlights 14 and 15 is initiated by placing the main headlight switch 13 in its "on" position as indicated by the dotted line 36. If the dimmer switch is in its "low" or first position, as indicated by dotted line 37, current flows from battery 11, through switch 13, through switch 16, and through a wire 30 to the low beam filament 8 of headlamp 14 and through a wire 29 to the low beam filament 9 of headlight 15.

If the dimmer switch 16 is in its "high" or second position, as shown, and flasher switch 17 is in its "off" or first position, current flows from battery 11 through switch 13, through switch 16 to wire 24, through contacts 18 and 19 to contacts 20 and 21 and through wires 25 and 26 to the high beam filaments 7 and 6 of headlights 15 and 14, respectively. Thus, with the flasher switch 17 in its "off" position as described, normal operation through the main headlight "on-off" switch 13 and dimmer switch 15 is achieved.

The flashing operation of high beams 6 and 7 may be accomplished with or without concurrent operation of the low beams, depending upon the time of day flashing is desired. During daylight hours, when the headlight switch 13 is generally "off", for instance, the flashing may be achieved by merely setting flasher switch 17 to its "on" or second position. Current then flows from battery 11, through wire 45 to flasher input 30, alternately through wires 34 and 35 via flasher outputs 32 and 33 to switch contacts 22 and 23 and contacts 20 and 21, thence alternately through wires 25 and 26 to the high beam filaments 6 and 7 of headlights 14 and 15, respectively. It can be readily appreciated that this flashing operation is initiated by the mere movement of flasher switch 17 to its "on" position, without movement of the main headlight switch 13 to its "on" position, and without regard to the position of dimmer switch 16.

Alternate flashing of the high beam filaments 6 and 7 may also be initiated while the low beam filaments 8 and 9 of both headlight 14 and 15 are operating. In this mode of operation, switch 13 is placed in its "on" position and the dimmer switch 16 is placed in its "low" position as shown by dotted line 37 so that current is conveyed to the low beam filaments as previously described. Concurrently, if the flasher switch is placed in its "on" position, so as to connect contacts 20 and 21 with flasher contacts 22 and 23 respectively, current will flow from battery 11, through wire 45 to flasher input 30 and alternately to the high beam filaments 6 and 7 of the headlights as previously described. Thus the operator has the advantage of the flashing high beam warning signal in addition to the concurrent steady operation of the low beam filaments.

Alternate flashing of the high beam filaments may also be initiated while the high beam filaments of both headlights are operating by merely placing flasher switch 17 in its "on" position. This breaks the steady current supply to the high beam filaments and begins the flashing operation as previously described. Of course, if the operator desires a concurrent steady beam, he must then place dimmer switch 16 in its "low" position to energize the low beam filaments.

A vehicle 38 with alternatively flashing high beams is shown in FIGS. 2 and 3. FIG. 2 depicts the operation when current is input from flasher 31 to the high beam filament 7 of light 15, and FIG. 3 shows the headlights with current input to the high beam filament 6 of light 14 with the high beam filament 7 of light 15 off.

An alternate embodiment is shown in FIG. 4 wherein the vehicle is provided with double or dual headlights. Similar numbers designate elements similar to those of the first embodiment. In a typical dual headlight system, four headlamp units are provided, With two located on each side of the vehicle. The inner two units 39 and 40 generally include a high beam filament and the outer two units 41 and 42 generally include both a high beam and a low beam filament. The low beam filaments of units 41 and 42 are connected to battery 11 through main switch 13, dimmer switch 16, wire 30 and wire 29 and operate in the same manner as the low beam filaments 8 and 9 of the prior embodiment. The high beam filaments of units 39, 40, 41 and 42 are connected through wires 25, 25A, 26 and 26A to contacts 20 and 21, respectively, of flasher switch 17. This switch is used to connect the high beam filaments of the light units to the battery 11 through dimmer switch 16 and through main headlight switch 13 as previously described. Alternately, the high beam units are connected through flasher switch 17 to the flasher 31, also as previously described.

Operation of this embodiment is the same as operation of the first embodiment with the exception that, when the high beam or flashing mode is in operation, two high beam filaments on each side of the vehicle are utilized. FIGS. 5 and 6 depict a vehicle of this embodiment when the flasher switch is in its "on" position and the main headlight switch 13 and dimmer switch 16 is positioned to concurrently energize the low beam filaments. In FIG. 5, current is flowing as previously described from the battery 11, through switch 13, dimmer switch 16 and wires 30 and 29 to steadily illuminate the low beam filaments of units 41 and 42. Current also flows from the battery 11 through flasher terminal 32, wire 34, flasher switch 17, and wires 25 and 25A to energize the high beam filaments of units 39 and 41. In FIG. 6, the low beam filaments of units 41 and 42 are steadily operating and current flows from flasher terminal 33, through wire 35, flasher switch 17 and wires 26 and 26A to energize the high beam filaments of units 40 and 42.

It can be seen that all the advantages of the first embodiment are incorporated into the second. Operation of the flasher warning is completely independent of the position of the main headlight switch or the dimmer switch. Further, when the high beams are flashing, the low beams may be turned on so that they constantly illuminate the area forwardly of the vehicle.

It can be readily appreciated that the concurrent operation of the flashing high beams and steady low beams is extremely advantageous since the low beams will provide a steady illumination of the area ahead of the vehicle while the high beams alternately flash for warning purposes. If operation of the flasher inherently precluded steady illumination of the area forward of the vehicle, nighttime driving visibility would be decreased and the danger vastly increased as the only illumination would be the intermittent flashing of the high beams.

It can also be readily appreciated that the operation of the flasher is completely independent of the operation of the main headlight switch 13 and the dimmer switch 16. Thus an operator can instantly initiate the flashing operation, whether night or day, without regard to the position of any switch other than the flasher switch.

Furthermore, the invention may be readily adapted for incorporation into existing lighting circuits in vehicles. The flasher and flasher switch may be constructed as a separate unit to be later easily combined with existing circuits by providing a flasher connected to a double-pole, double-throw flasher switch and with a contact for connection to a source of electrical power. The other contacts of the flasher switch are provided for connection to the high beam contact of a dimmer switch and to the high beam filaments of the headlamps as previously described.

I have found that the use of alternately flashing high beams is extremely effective and visually attractive even during the daylight hours, and that under certain conditions such flashing is more readily visible than, for instance, even the revolving red, yellow or blue lights now commonly found on emergency vehicles. The ability to instantly initiate the flashing operation without regard to the position of other switches than the flasher switch allows the operator an extra margin of safety in the control of his vehicle, since it is unnecessary to divert his attention to a plurality of switches. This factor is in itself an inducement to initiate the flashing warning whenever necessary rather than not initiate it, when needed for only short periods of time, due to the relative difficulty of operation.

In accordance with a further embodiment of the invention, simultaneous flashing of the high beam filaments may be accomplished merely by connecting wires 34 and 35 to either one of flasher terminals 32 or 33. This embodiment is shown in FIG. 7 and it is to be understood that FIG. 7 shows only the connection of the flasher, the rest of the elements being the same as in FIGS. 1 or 4. The advantage of maintaining a steady illumination of the low beam filaments while the high beam filaments concurrently flash is maintained as well as the advantage of initiating the flashing of the high beam filaments independently of the dimmer switch 16 and on-off switch 13.

In an even further embodiment, a single output pulsating type flasher 50 could be utilized in place of the alternating flasher described. Such a flasher has input contact 51 connected to battery 11 through wire 45 and an output contact 52 connected through wire 53 to contacts 22 and 23 of flasher switch 17. The control operation of this embodiment is the same as that described for other embodiments and results in a simultaneous flashing of the high beam filaments. This embodiment is shown in FIG. 8 and it is to be understood that FIG. 8 shows the alternate flasher connection, the rest of the elements being the same as in FIGS. 1 or 4 except, of course, wires 34 and 35, which would be omitted on this embodiment. The advantage of the simultaneous high beam filament flashing with concurrent steady illumination of the low beams is maintained as well as the advantage of independent initiation of the flashing operation without regard to the position of dimmer switch 16 and on-off switch 13.

It is to be further understood that the invention incorporates the concept of solid state electronics. For instance, the flasher switch could be replaced by switching transistors or silicon control rectifiers, and the flasher could be replaced with an astable multivibrator in a manner well known to those of ordinary skill in the art.

The invention has been described in connection with its use to flash the high beam filaments, with the capability of having concurrent low beam filament operation. Obviously, the invention can be used to flash the low beam filaments, with concurrent high beam filament operation by merely changing the connections of the groups of filaments to the other circuit elements.

While specific embodiments of an alternate flashing warning system have been illustrated and described herein, those skilled in the art will readily appreciate that this invention is susceptible to numerous changes and modifications without departing from the spirit of the present invention. Therefore, the invention is not intended to be limited except by the scope of the appended claims.

Having described my invention, I claim:

1. In a circuit for controlling the flashing of vehicle lights, including at least two headlight units each having at least a high beam filament and a low beam filament, a source of electrical power, a main headlight switch selectively positionable between a closed-circuit "on" position and an open-circuit "off" position, a dimmer switch connected via said main headlight switch to said source of electrical power, said dimmer switch having a high beam contact and a low beam contact and having means switchable between two positions for alternatively connecting said high and low beam contacts to said source of electrical power via said main headlight switch, and said circuit adapted for alternately flashing the high beam filaments regardless of the respective positions of said dimmer switch and of said main headlight switch, the improvement comprising, a flasher means having an input connected to said source of electrical power and having two flasher outputs, said flasher means alternately energizing said two outputs when current is applied through said flasher means, a flasher switch means having a first pair of contacts, each connected to a different one of said high beam filaments, a second pair of contacts each connected to different ones of said two flasher outputs, and a third pair of contacts, both contacts in said third pair being connected to said high beam contact of said dimmer switch, said flasher switch means in one position connecting respective ones of said first pair of contacts to respective ones of said second pair of contacts in order to thereby alternately energize said high beam filaments irrespective of the position of said dimmer switch and said main headlight switch, and in a second position connecting respective ones of said first pair of contacts to respective contacts of said third pair of contacts and thereby to said high beam contact of said dimmer switch in order to energize said high beam filaments concurrently when said main headlight switch is in an "on" position and when the high beam contact of the dimmer switch is connected to the source of electrical power via said main headlight switch, and said dimmer switch being effective to selectively connect Said low beam filaments to the source of electrical power through said main headlight switch without regard to the position of said flasher switch means.

* * * * *